United States Patent [19]
Davis

[11] Patent Number: 4,594,381
[45] Date of Patent: Jun. 10, 1986

[54] METHOD FOR IMPROVED METAL ADHESION AND METAL ADHESION RETENTION

[75] Inventor: James A. Davis, Uniontown, Ohio

[73] Assignee: The Firestone Tire & Rubber Company, Akron, Ohio

[21] Appl. No.: 741,410

[22] Filed: Jun. 5, 1985

[51] Int. Cl.⁴ .......................... C08K 5/09; C08L 7/00; C08L 9/00; C08L 61/10
[52] U.S. Cl. ..................... 524/396; 524/174; 524/398; 524/512
[58] Field of Search ............... 524/174, 512, 396, 398; 525/236

[56] References Cited

U.S. PATENT DOCUMENTS

| | | |
|---|---|---|
| 1,919,718 | 7/1933 | Gray . |
| 2,822,026 | 2/1958 | Willis ................................. 154/14 |
| 2,912,355 | 11/1959 | Formanek et al. .................. 154/130 |
| 4,076,668 | 2/1978 | Kaneda et al. ...................... 524/398 |
| 4,154,911 | 3/1979 | Bak et al. ........................... 524/398 |
| 4,258,770 | 3/1981 | Davis et al. ..................... 152/330 R |
| 4,383,005 | 5/1983 | Weil et al. ........................... 428/625 |
| 4,435,377 | 3/1984 | Davis ................................. 428/462 |

Primary Examiner—Allan M. Lieberman
Attorney, Agent, or Firm—Daniel N. Hall

[57] ABSTRACT

A method for improving metal adhesion and metal adhesion properties between a vulcanizable rubber composition and brass or zinc or brass-plated or zinc-plated metallic reinforcing elements includes dispersing from about 0.5 to about 12.5 parts by weight of an organic salt of nickel or cobalt per 100 parts of rubber component in a sulfur vulcanizable rubber composition and dispersing from about 0.5 to 15 parts by weight of a thermosetting two-step phenolic resin per 100 parts of the rubber component in the same rubber composition prior to curing.

7 Claims, No Drawings

METHOD FOR IMPROVED METAL ADHESION AND METAL ADHESION RETENTION

TECHNICAL FIELD

The present invention is directed toward improving the adhesion and adhesion retention between a rubber composition, used in the manufacture of tires, conveyor belts, hoses and the like, and metallic reinforcement cord, such as steel wire and cable which commonly carries a protective coating of brass or zinc and is embedded in the stock. Flat sheets or strips of such stocks, reinforced with metal or fibers, are utilized as plies or other components of the article and are referred to in the art as rubber skim stocks. Skim refers to a relatively thin layer or coating of the rubber over the reinforcement filaments or cords. Greater thicknesses of rubber are also bonded to metal in other instances such as motor mounts and these would not be termed skim stocks.

In the manufacture of the foregoing rubber articles, particularly steel-belted bias and radial tires, it has become common to reinforce the rubber skim stock material with steel wire or cable. One of the more important uses for a metallic reinforced rubber is as a belt where one or more of these belts are substantially circumferentially oriented beneath the tread stock to maintain the integrity and shape of the tire during inflation and subsequent load. Other areas where metal reinforced rubber skim stock may be utilized are in the body ply, bead or chafer of a tire.

In order for these components to function effectively, it is imperative that adhesion between the rubber and the steel cord be effectively maintained. Because steel is prone to oxidation, which even in minor degree is highly deleterious to the necessary adhesion with the rubber skim stock, often it is impractical to incorporate a chemically clean, oxidation-free steel cord in the belt at the time of its manufacture, the steel cord is plated with brass or zinc thereby protecting it from oxidation until it can be used.

While adhesion between brass and zinc plated steel cord and rubber is generally far greater than that between the latter and oxidized steel, existing data determined from article life as well as modern testing techniques indicates the desirability of adding materials to rubber to improve article life and service through increased adhesion and adhesion retention. Improved adhesion between rubber and brass or zinc or the rubber skim stock and brass-plated or zinc-plated steel is obtained according to the present invention.

BACKGROUND ART

In order to promote adhesion between rubber and ferrous metals, it is known to employ a variety of metallic salts as coatings to the metal or as ingredients in the rubber composition. Exemplary of the former coating technique is U.S. Pat. No. 1,919,718 which is directed toward improving the adhesion between rubber and metal by coating the metal with a rubber cement which comprises a metal salt of a low molecular weight fatty acid.

Typical of the latter technique of the incorporation of the salt into the composition is U.S. Pat. No. 2,912,355, which is directed toward improving the adhesion between rubber and metal by the incorporation into a rubber composition of a calcined and thus partially to fully oxidized metal salt of an aliphatic fatty acid compound. The metal can be cobalt, copper, iron, lead, mercury, nickel or silver.

It is also known to add various resins as tackifiers and/or adhesion promoters and, in other instances, to employ both a metal salt and a resin. For example, the use of a rosin-derived resin in combination with a nickel or cobalt inorganic salt in a rubber composition to improve adhesion is disclosed in U.S. Pat. No. 4,258,770 owned by the common Assignee. The use of a thermoplastic resin, derived from crude wood rosin containing carboxylic acid groups or carbon carboxylic acid ester groups, in combination with an organic salt of nickel to improve adhesion is disclosed in U.S. Pat. No. 4,435,477 also owned by the common Assignee. However, none of these resins are thermosetting but rather they are thermoplastic in nature. Moreover these resins are all naturally occurring resins rather than synthetic.

With respect to the known uses of thermosetting two-step phenolic resins, typical is U.S. Pat. No. 2,822,026, owned by the common Assignee, which is directed toward the use of a thermosetting two-step phenolic resin and a rubber composition to prevent or retard rubber flow during vulcanization thereby providing a sufficient quantity of rubber in the bead area of the tire. However, there is no disclosure of the use of a nickel salt in combination with the resin or that the resin alone or in combination improves adhesion properties.

Finally, U.S. Pat. No. 4,383,005 is directed toward a rubber composition having improved metal adhesion properties wherein the composition contains a reinforcing filler containing active silicic acid and at least one resin derived from polyhydric phenols and aldehydes. However there is no disclosure of the use of metal salts or that improved adhesion results in stocks that do not contain silica.

While others have sought to enhance adhesion between rubber compositions and metals by employing various combinations of nickel salts and other metal salts with various resins, the art of has been presented herein has not disclosed the exclusive use of an organic salt of nickel or cobalt with a thermosetting two-step phenolic resin to increase adhesion properties beween rubber and metal reinforcements.

DISCLOSURE OF THE INVENTION

The present invention provides a method of improving metal adhesion and metal adhesion retention properties between a vulcanizable rubber composition and brass or zinc-plated metallic reinforcing elements when cured including the steps of dispersing from about 0.5 to 12.5 parts by weight of an organic salt of nickel or cobalt per 100 parts of rubber component in said rubber composition and dispersing from about 0.5 to 15 parts by weight of a thermosetting two-step phenolic resin per 100 parts of the rubber component in said rubber composition prior to curing.

PREFERRED MODE FOR CARRYING OUT THE INVENTION

To illustrate the invention, a typical example of a rubber composition with metallic reinforcement embedded therein was chosen. In particular, the example used to demonstrate the invention was a rubber skim stock which is suitable for the preparation of rubber articles such as tires. Adhesion between this stock with brass-plated and zinc-plated steel reinforcement subsequent to vulcanization was measured and has also been presented hereinbelow.

The polymer portion of the rubber composition used in the following examples comprised 100 parts by weight of a natural rubber. Polymer type, here, is not deemed to be a limitation to the practice of the subject invention. Natural rubber may also be employed in a blended state with one or more synthetic rubbers such as styrene-butadiene, synthetic isoprene or other synthetic rubbers with a natural rubber content of at least 40 to 50 percent. Further, pure forms of synthetic rubbers such as those disclosed may be used either alone or blended with other synthetic rubbers. However, rubbers wherein the diene unsaturation is too low, such as EPDM, e.g., six percent, are not employed in the practice of the subject invention. Generally, diene unsaturation of about 95 percent should be present where synthetic rubbers are employed. All of the foregoing rubbers and blends are all sulfur curable which is the preferred curative exemplified hereinbelow. Nevertheless, the use of other curatives is not to be precluded.

An ingredient utilized in the practice of the present invention includes an organic salt of nickel or cobalt with aliphatic and aromatic carboxylic acids, having from one to about 22 carbon atoms. The salts are prepared by the combination of nickel or cobalt hydroxide or hydrate and the carboxylic acid. Suitable monocarboxylic acids used to practice the present invention would be preferably, acetic, propionic, butyric, valeric, octanoic, undecanoic, lauric, palmitic, stearic, nonadecanoic, benzoic and the like. A preferred organic salt is nickel octoate which was employed in the experimental work discussed hereinbelow. It can be prepared from octanoic acid and nickel hydrate. Nickel octoate is a light green powder having between about 14.8 and 17 percent nickel, a specific gravity of 1.19 at 23° C. and a moisture content of about 4 percent.

Nickel octoate and others of the salts disclosed herein can contain moisture resulting from preparation and/or the atmosphere. While the salt can be dried according to known methods in the art to remove any water of hydration or other moisture, it is desirable that the salt be uncalcined as well as unoxidized during drying or before use in the present invention inasmuch as independent tests run in the laboratory of the Assignee of record with calcined salts of monocarboxylic acids have established that a decrease in adhesion properties resulted in instances where the metal salt, per se, was employed to improve adhesion.

Suitable dicarboxylic acids include both aliphatic and aromatic acids having from two to about 22 carbon atoms. These include acids such as oxalic, malonic, maleic, succinic, glutaric, adipic, pimelic, suberic, azelaic, sebacic, phthalic, isophthalic, terephthalic, homophthalic, o, m and p-phenylenediacetic and o-phenyleneacetic-beta-propionic acid.

Amounts of the nickel or cobalt salt employed can range from about 0.5 to about 12.5 parts per hundred parts of rubber (phr) with 0.5 to 5 phr and specifically 2.06 phr being preferred.

With respect to the thermosetting two-step phenolic resin, this type of resin is produced by mixing an excess of a phenol with formaldehyde in the presence of an acidic catalyst. The resultant resin is referred to as a "novalac" and has methylene bridges between the phenolic nuclei. The general formula for the resin is as follows:

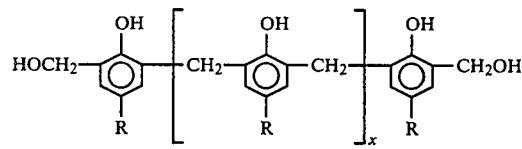

wherein R is aliphatic and has from four to twenty carbons, linear or branched, with four to twelve carbons being preferred and x is a number such that the resin has an average molecular weight of from about 1200 to 3000 and is typically 1800.

The methylene bridges are stable to heat and provide the resin with heat stability, hence, the thermosetting characteristics of the resins. The resin is then cured by adding a methylene donor, such as hexamethylenetetramine or paraformaldehyde, to the phenolic resin. Thus, inasmuch as the production of the resin and its curing occur in two distinct stages, the resin is called a two-step resin.

A Hooker Chemical product, Durez 13355 has been found to be particularly effective with nickel octoate in promoting adhesion between rubber skim stocks containing these additives and brass or zinc. Durez 13355, a synthetic resin, is a registered trademark of Hooker Chemical for light tan, finely powdered thermosetting two-step phenolic resins. Literature supplied by Hooker provides the properties of Durez 13355 which are as follows: acetone solubility 98.5% min.; hexamethylenetetramine content of 6.5 to 8.0%; ash content 1%; specific gravity 1.165 to 1.280%; fineness through a #100 sieve 99.9% min.; and a capillary melting point of 80° C.±10° C. Further specifics can be obtained directly from Hooker Chemical. A similar two-step resin with equivalent properties is a Sherwin-Williams Company product Dyphene 6745.

A Polymer Applications, Inc. product, PA-52-329 has also been found to be effective. PA-52-329 is a phenolformaldehyde resin modified with vegetable oil and made thermosetting by the incorporation of the methylene donor, hexamethylenetetramine. Its properties as provided for by the manufacturer's literature are as follows: hexamethylenetetramine content 8%; specific gravity 1.165±0.02; bulk density 23±1 lbs per cu ft; ash content 1.3%, fineness through a #200 mesh less than 5%; and capillary melting point 80° C.±10° C. Further specifics can most likely be obtained directly from Polymer Applications, Inc.

For purposes of this disclosure all these resins are referred to as thermosetting two-step phenolic reins. It is to be understood that Durez 13355, PA-52-329 and Dyphene 6745 are three commercially available resins that have been found to be satisfactory; however, these resins are not necessarily specific to the exclusion of others as it is believed that other resin products having similar properties and components could be substituted for the three above-mentioned resins. Amounts of the resin that can be employed effectively are from about 0.5 to 15 phr and preferably from about 1 to about 6 phr and specifically 5 phr.

In order to determine the improvement in adhesion obtained when a nickel or cobalt salt and a thermosetting two-step phenolic resin are added to the rubber skim stock, T-adhesion tests (rubber-steelcord) were conducted.

The rubber-to-metal adhesion test utilized T-adhesion pads prepared by placing 60 guage sheets of uncured fully compounded rubber skim stock on 51 gauge fabric reinforced rubber backing. Commercial brass-coated and zinc-coated wires (7/2+1 wire) were placed between two pads of the reinforced skim stock with the wires in contact with the uncured rubber skim at 1.25 cm. intervals. The width of each adhesion pad was 1.25 cm. The pads were placed in a mold and were cured for 30 minutes at 149° C. Testing was done on a Model 1130 Instron Universal Tester at a crosshead speed of 25.4 cm per minute with samples preheated for 20 minutes at 110° C. prior to testing. Oven aging of the cured T-adhesion pads was done in a forced air oven at 121° C. for two days. Oxygen bomb aging of the cured samples was done in a pressure tight bomb for 24 hours and for 48 hours at 70° C., in a 100 percent oxygen atmosphere. Steam bomb aging of the cured sample was done in a pressure tight bomb for one hour at 149° C.

DETAILED T-ADHESION TEST PROCEDURE

1. Using a Clicker machine and a 15.24×1.25 cm die, prepare an adequate number of calendered and control stock samples for T-adhesion pad building.
2. Use one piece of calendered fabric reinforced rubber backing (0.1295 cm).
3. Ply one piece of 60 gauge control rubber skim stock (0.1524 cm) onto the fabric backing.
4. Place sample in building jig with fabric side down.
5. Place ten cords (of brass or zinc coated wire) approximately 17.78 cm in length equally spaced on top of the two piece assembly.
6. Invert another 2 ply assembly, made as in items 1, 2 and 3, on top of cords so that cords are between the 2 layers of rubber skim stock to be tested.
7. This assembly should now fit snugly into the cavity of the curing mold.
8. Adhesion pads shall be cured for 30 minutes at 149° C. and then allowed to equilibrate for 24 hours before testing.
9. Testing Machine: Model 1130 Instron Universal Tester.
10. Test speed 25.4 cm/minute; testing temperature, 110° C. after 20 minutes preheat.
11. The top grip shall be of a special holder made for the cured sample, with a slot in the bottom to permit the sample to be inserted with the wires protruding. The bottom grip should be a wedge type, designed to exert increasing tightening as each wire is pulled from the cured sample.
12. Record 10 wire pull-outs and average. Multiply average pull-out force value by 0.3572 to obtain kilograms per centimeter.

In the tests which follow, a rubber skim stock composition A, was prepared which did not contain the adhesion promoting ingredients of the present invention. Rubber compositions B–D were prepared exactly the same except they contained nickel octoate and/or the thermosetting two-step phenolic resin according to the present invention. Formulations for each are as follows with all parts given on the basis of parts per hundred parts of rubber (phr) by weight.

| Compounding Ingredients | Composition A |
| --- | --- |
| Natural Rubber (E grade) | 100 |
| HAF Black | 50 |
| Zinc Oxide | 8.0 |
| Stearic Acid | 0.50 |
| Santoflex DD[1] | 1.0 |
| Naphthenic process oil | 2.0 |
| Santoflex 13[2] | 1.0 |
| NOBS Special accelerator[3] | 0.70 |
| Sulfur MB[4] | 7.50 |

[1] 6-dodecyl-1,2-dihydro-2,2,4-trimethylquinoline
[2] N—(1,3-dimethylbutyl)-N'—phenyl-p-phenylenediamine
[3] N—oxydiethylene benzothiazole-2-sulfenamide (NOBS Special accelerator)
[4] 80/20 sulfur/extender oil preblend, with a naphthenic oil in the range of 18-22% oil. The sulfur is a yellow powder, 89.5% min. of which is insoluble sulfur.

It should be noted that the thermosetting resin is added substantially at the time of addition of the curative, generally the final mix. That is, it is added last with the accelerators, cure retarders and sulfur masterbatch and after the other components have been combined and milled in order to insure adequate and thorough dispersion of the rubber stock. Addition of the nickel or cobalt salt is not critical and can occur at any stage of the mixing procedure. Thus, in compositions B–D, Santoflex 13, Santoflex DD and nickel octoate were added to the masterbatch and during Banbury mixing. The curing ingredients, e.g., sulfur MB, NOBS special accelerator and thermosetting two-step phenolic resin were incorporated in the rubber masterbatch during mill finalling.

It is to be understood that the foregoing composition of the rubber skim stock has been presented solely to enable those skilled in the art to have at least one rubber skim stock with which to practice the invention. As such, the present invention is not to be limited only to this specific formulation.

The four compositions were each used to build T-adhesion pads with brass-plated and zinc-plated steel cord. Five sets of adhesion tests were conducted on each of the four stocks for comparison. Table I shows the results of the test for brass-plated and zinc-plated steel cord under normal, oven aged, oxygen and steam aged conditions. The force necessary to pull or remove the metallic reinforcement from the vulcanized rubber skim stock is given first, in Kg/cm, followed by the percent of rubber skim stock remaining on the surface of the metallic reinforcement. The amount of rubber skim stock remaining on the metallic reinforcement was determined by visual examination and has been reported as % rubber coverage.

TABLE I

| Short Term Aged Steel Cord T-Adhesion Tests | | | | |
| --- | --- | --- | --- | --- |
| Rubber Compositions | A | B | C | D |
| NOBS Special, phr | 0.60 | 0.60 | 0.60 | 0.70 |
| Sulfur MB, phr | 7.50 | 7.50 | 7.50 | 7.50 |
| Ni Octoate, phr | — | 2.06 | 2.06 | 2.06 |
| Durez 13355 Resin, phr | — | — | 2.50 | 5.00 |
| Test A | | | | |
| Normal (Unaged)[a] | | | | |
| Brass-plated cord | | | | |
| Kg/cm | 21.80 | 25.77 | 27.00 | 26.48 |
| % rubber coverage | 40 | 90 | 95 | 95 |
| Zinc-plated cord | | | | |
| Kg/cm | 5.02 | 7.34 | 15.93 | 18.89 |
| % rubber coverage | 0 | 0 | 5–10 | 55 |
| Test B | | | | |
| Oven Aged[b] | | | | |
| Brass-plated cord | | | | |
| Kg/cm | 15.46 | 18.50 | 19.82 | 20.30 |
| % rubber coverage | 60–65 | 95–100 | 100 | 100 |
| Zinc-plated cord | | | | |

TABLE I-continued

| Short Term Aged Steel Cord T-Adhesion Tests | | | | |
|---|---|---|---|---|
| Rubber Compositions | A | B | C | D |
| Kg/cm | 2.78 | 6.57 | 13.82 | 16.96 |
| % rubber coverage | 0 | 0 | 60 | 80 |
| Test C | | | | |
| Oxygen Bomb Aged[c] | | | | |
| Brass-plated cord | | | | |
| Kg/cm | 16.05 | 21.43 | 22.89 | 23.46 |
| % rubber coverage | 10–15 | 85 | 95 | 95 |
| Zinc-plated cord | | | | |
| Kg/cm | 3.59 | 5.61 | 15.39 | 17.18 |
| % rubber coverage | 0 | 0 | 35 | 75–80 |
| Test D | | | | |
| Oxygen Bomb Aged[d] | | | | |
| Brass-plated cord | | | | |
| Kg/cm | 16.04 | 17.62 | 19.45 | 20.11 |
| % rubber coverage | 10 | 80 | 95 | 95 |
| Zinc-plated cord | | | | |
| Kg/cm | 2.84 | 4.70 | 12.66 | 15.00 |
| % rubber coverage | 0 | 0 | 35–40 | 70–75 |
| Test E | | | | |
| Steam Bomb Aged[e] | | | | |
| Brass-plated cord | | | | |
| Kg/cm | 30.00 | 29.14 | 27.14 | 26.96 |
| % rubber coverage | 90 | 95 | 90–95 | 90–95 |
| Zinc-plated cord | | | | |
| Kg/cm | 4.07 | 14.64 | 21.43 | 24.00 |
| % rubber coverage | 0 | 25 | 85 | 90 |

[a]T-adhesion pads cured 30 minutes at 149° C. and tested at 110° C.
[b]T-adhesion pads cured 30 minutes at 149° C., heat aged in forced air oven for 2 days at 121° C. and tested at 110° C.
[c]T-adhesion pads cured 30 minutes at 149° C., aged in a 100 percent oxygen atmosphere for 24 hours at 70° C. and tested at 110° C.
[d]T-adhesion pads cured 30 minutes at 149° C., aged in a 100 percent oxygen atmosphere for 48 hours at 70° C. and tested at 110° C.
[e]T-adhesion pads cured 30 minutes at 149° C., aged in steam for 1 hour at 149° C. and tested at 110° C.

As can be determined from Table I, Test A, adhesion of compositions B–D to brass-plated and zinc-plated steel cord was significantly better than for composition A. Rubber composition A, which contained neither the resin nor the nickel or cobalt salt, showed lower adhesion values with 40 percent rubber coverage for the brass-plated cord and no rubber coverage for zinc-plated cord. As can be seen from Test B, compositions B–D showed significantly greater adhesion and exhibited excellent coverage and, therefore, superior rubber to metal adhesion over composition A.

The effect of oxygen exposure to the rubber-metal bond is presented in Tests C and D. Oxygen, which commonly functions as an oxidizing agent has long been known by those skilled in the art to have deleterious effects on the chemical nature of the rubber to metal bonds whether they be zinc-sulfur or copper-sulfur bridges. Again, a significant improvement in adhesion and rubber coverage was observed for compositions B–D as compared with the control, composition A.

The rubber coverage measurement is deemed to be significant in that it visually represents the increased adhesion of the rubber composition to the plated steel cord. As is well known to those skilled in the art, the amount of rubber left adhering to the steel cord after it has been pulled from a cured T-adhesion pad represents the relationship of the adhesive force attaching the rubber composition to the surface of the steel cord and the rear strength of the rubber composition itself. Large percentages of rubber coverage indicate that the adhesion to the steel cord exceeds the internal strength of the rubber composition itself, i.e., tear strength. Therefore, when the rubber coverage is very high it can be concluded that the metal to rubber adhesion is greater than the force measured to pull the steel cord out of the rubber pad since the force measured was a result of the rubber composition rupturing and not the metal to rubber interface.

Generally, the presence of the nickel salt and the resin did not have a deleterious effect on the rubber to metal bond where brass-plated steel was embedded. However, a significant improvement was seen where zinc-plated steel was embedded. Although the invention requires the addition of a metallic salt and a thermosetting resin to the rubber stock, it can be noted that some improvement in adhesion occurred merely by adding the metallic salt. However, in every instance where zinc-plated steel was employed the adhesion was significantly improved only where the resin was also present, namely stocks C and D. While the improvement was slightly less dramatic for brass-plated steel, nevertheless, the data demonstrates a minor improvement in adhesion and there was no deleterious effect.

Normal or unaged testing is merely a measurement of the initial adhesive properties between the rubber composition and the metallic reinforcement. The oven aging test is an accelerated heat aging test and is significant in determining the effect of heat on the thermal stability of the chemical bonds formed between the rubber composition and the metallic reinforcement during vulcanization. The significance of oxygen bomb aging tests is to determine the chemical stability of chemical bonds between the rubber skim stock and the metallic reinforcement when exposed to conditions of high oxygen atmosphere and high temperature, as compared to ambient, and extended periods of time. Steam bomb aging is an accelerated humidity aging test and is significant in determining the chemical stability of the chemical bonds formed between the rubber skim stock and the metallic reinforcement when exposed to moisture or steam under pressure.

Based on the foregoing results reported in Table I, the presence of thermosetting two-step phenolic resins set forth herein such as Durez 13355 and the nickel or cobalt salt such as nickel octoate in a rubber skim stock have been shown to be effective in promoting adhesion between the rubber skim stock and brass-plated or zinc-plated metallic reinforcement. As stated hereinabove, the rubber can be natural or synthetic or a blend and formulated as a rubber stock or a skim stock. Also, the metallic reinforcement employed in the practice of the invention can be in the form of a strand, mat, web, ply or braid.

The present invention also finds utility in, for example, other rubber articles bonded to brass or brass-plated steel such as motor mounts, cutless bearings, torsilastic springs, power belts, printing rolls, metal wire reinforced or braided hose, electrical deicers, shoe heels and wherever it is desired to secure rubber to metal or provide a flexible and strong, thermally stable bond between the same.

In conclusion, it is to be understood that all variations in the method as well as the rubber compounds disclosed herein fall within the scope of the claimed invention and that the subject invention is not to be limited by the examples set forth herein. As will be apparent to those skilled in the art, the formulation of the rubber composition can be varied within the scope of the total specification disclosure by selection of various organic salts of nickel and thermosetting two-step phenolic resins of the type set forth herein as well as the amounts thereof, and it is believed that practice of the present invention can be determined without departing from the spirit of the invention herein disclosed and described, the scope of the invention being limited solely by the scope of the attached claims.

I claim:

1. A method for improving metal adhesion and metal adhesion properties between a vulcanizable rubber composition and brass or zinc or brass-plated or zinc-plated metallic reinforcing elements comprising the steps of:

dispersing from about 0.5 to about 12.5 parts by weight of an organic salt of nickel or cobalt selected from the group consisting of aliphatic and aromatic monocarboxylic acids having from one to about 22 carbon atoms and aliphatic and aromatic dicarboxylic acids having from two to about 22 carbon atoms per 100 parts of rubber component in said rubber composition; and dispersing from about 0.5 to 15 parts by weight of a thermosetting two-step phenolic resin per 100 parts of the rubber component in said rubber composition prior to curing; wherein said vulcanizable rubber composition is selected from the group consisting of natural and synthetic rubbers having a diene unsaturation of about 95 percent, and mixtures, thereof.

2. A method as set forth in claim 1, wherein said organic salt of nickel or cobalt is nickel octoate and the amount employed is 2.06 parts per 100 parts of rubber.

3. A method as set forth in claim 1, wherein said thermosetting two-step phenolic resin has the formula

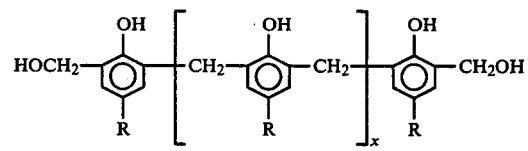

wherein R is aliphatic and has from four to about twenty carbons and x is a number such that the average molecular weight is from about 1200 to 3000.

4. A method as set forth in claim 1, wherein the amount employed of said thermosetting two-step resin is from about 1 to about 6 parts per 100 parts of rubber.

5. A method as set forth in claim 1, wherein said vulcanizable rubber additionally comprises carbon black, processing oils, accelerators, cure retarders and a curative.

6. A method as set forth in claim 5, wherein said step of dispersing said thermosetting resin occurs substantially at the time of addition of said curative.

7. A method as set forth in claim 6, wherein said curative comprises sulfur.

* * * * *